(12) United States Patent
Gubbins et al.

(10) Patent No.: US 9,099,130 B2
(45) Date of Patent: Aug. 4, 2015

(54) PLASMONIC WAVEGUIDE WITH AN ANGLED, ELONGATED PORTION

(71) Applicant: Seagate Technology LLC, Cupertino, CA (US)

(72) Inventors: Mark Gubbins, Donegal (IE); Marcus B. Mooney, Donegal (IE)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/940,886

(22) Filed: Jul. 12, 2013

(65) Prior Publication Data

US 2015/0016238 A1  Jan. 15, 2015

(51) Int. Cl.
| | | |
|---|---|---|
| G11B 5/00 | (2006.01) | |
| G11B 5/48 | (2006.01) | |
| G02B 6/34 | (2006.01) | |
| G02B 6/42 | (2006.01) | |
| G02B 6/122 | (2006.01) | |

(52) U.S. Cl.
CPC ............ *G11B 5/4866* (2013.01); *G02B 6/1226* (2013.01); *G02B 6/1228* (2013.01); *G02B 6/34* (2013.01); *G02B 6/4204* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,835,458 A | 11/1998 | Bischel et al. |
| 6,813,432 B2 | 11/2004 | Salib |
| 7,330,404 B2 * | 2/2008 | Peng et al. ...................... 360/59 |
| 8,339,906 B2 | 12/2012 | Seigler |
| 2003/0179974 A1 | 9/2003 | Estes et al. |
| 2007/0223940 A1 | 9/2007 | Smolyaninov et al. |

* cited by examiner

*Primary Examiner* — Wayne Young
*Assistant Examiner* — Brian Butcher
(74) *Attorney, Agent, or Firm* — Hollingsworth Davis, LLC (57) ABSTRACT

An apparatus includes an input region having a high-refractive-index material and an input surface configured to receive light emitted from a laser. An output surface of the apparatus is configured to deliver energy to a recording medium. The apparatus includes a plasmonic waveguide having a first elongated portion at an angle to the input surface and configured to receive the light through the input region. In response to receiving the light, surface plasmons are excited and guided to an end of the first elongated portion. The plasmonic waveguide includes a second elongated portion coupled to the end of the first elongated portion and configured to guide the surface plasmons to the output surface.

20 Claims, 6 Drawing Sheets

PLASMONIC WAVEGUIDE WITH AN ANGLED, ELONGATED PORTION

SUMMARY

The present disclosure is related to plasmonic waveguides used in applications such as integrated optics devices. In one embodiment, an apparatus includes an input region having a high-refractive-index material and an input surface configured to receive light emitted from a laser. An output surface of the apparatus is configured to deliver energy to a recording medium. The apparatus includes a plasmonic waveguide having a first elongated portion at an angle to the input surface and configured to receive the light through the input region. In response to receiving the light, surface plasmons are excited and guided to an end of the first elongated portion. The plasmonic waveguide includes a second elongated portion coupled to the end of the first elongated portion and configured to guide the surface plasmons to the output surface. At least one of the first and second elongated portions may optionally have a gradually increasing thickness along a propagation direction from the input surface to the output surface.

In another embodiment, a method involves emitting light from a laser to an input surface of an input region of a recording head. The input region includes a high-refractive-index material. In response to emitting the light, surface plasmons are excited at a first elongated portion of a plasmonic waveguide. The first elongated portion is disposed at an angle to the input surface. The surface plasmons are guided to an output surface of the recording head via a second elongated portion of the plasmonic waveguide that is coupled to the end of the first elongated portion. The surface plasmons are delivered to heat a portion of a recording medium via the output surface.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures.

DETAILED DESCRIPTION

The present disclosure is generally related to the use of an elongated plasmonic metal element (e.g., plasmonic waveguide) that receives light from an energy source (e.g., laser diode) and delivers the light to a recording medium (e.g., a heat-assisted, magnetic recording medium) via an output surface of a recording head. The plasmonic waveguide is formed integrally within the recording head using a plasmonic metal such as gold, silver, copper, aluminum, or alloy thereof. The laser diode is attached to an outer surface of the recording head, and directs its output to an angled portion of the plasmonic element. The angle of the plasmonic element is selected so that total internal reflection of the light is achieved (or nearly so) at the first elongated portion.

A heat-assisted, magnetic recording (HAMR) data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

A HAMR read/write element, sometimes referred to as a slider or read/write head, includes magnetic read and write transducers similar to those on current hard drives. For example, data may be read by a magnetoresistive sensor that detects magnetic fluctuations of the moving medium. Data may be written to the magnetic medium by a write coil that is magnetically coupled to a write pole. A HAMR slider will also generally include a source of energy, such as a laser diode, and an optical delivery path through the slider that delivers the energy to the surface of the medium.

The optical delivery path of a HAMR slider may include a near-field transducer (NFT) proximate a media-facing surface (e.g., air-bearing surface, contact surface). The NFT shapes and transmits the energy to a small region on the medium. The NFT is sometimes referred to as an optical antenna, surface plasmon resonator, etc., and is usually formed at least in part of a plasmonic metal such as gold, silver, copper, aluminum, etc., and alloys thereof. The NFT for a HAMR device is very small (e.g., on the order of 10 to 100 nm, or any value therebetween) and creates a localized region of high power density in the media through an electromagnetic interaction. This results in a high temperature rise in a small region on the media, with the region exceeding the Curie temperature having dimensions less than 100 nm.

A laser (or other energy source) may be separate from or attached to the HAMR slider. Configurations where a laser (e.g., edge-emitting or surface-emitting) is attached to the HAMR slider allows for parallel attachment of large numbers of lasers at once to a wafer of slider bodies, thereby reducing manufacturing costs. Depending on the orientation of the laser, light output of the laser may be perpendicular to the plane of the wafer. This may facilitate monitoring output of the laser during manufacture, to ensure proper alignment, output power, coupling efficiency, etc. This may also mean that the output of the laser may need to be redirected, e.g., at a right angle, to direct output energy to the media-facing surface.

In embodiments described below, a plasmonic waveguide is used to guide and direct energy from the laser diode to the recording medium. In reference to FIG. 1, a perspective view shows HAMR slider assembly 100 according to an example embodiment. The slider assembly 100 includes a laser diode 102 located on input surface 104 of a slider body 101. In this example, the input surface 104 is a trailing edge surface, meaning that a surface of a recording medium (not shown) moving underneath the slider assembly 100 passes under the input surface 104 last.

Figure 1:
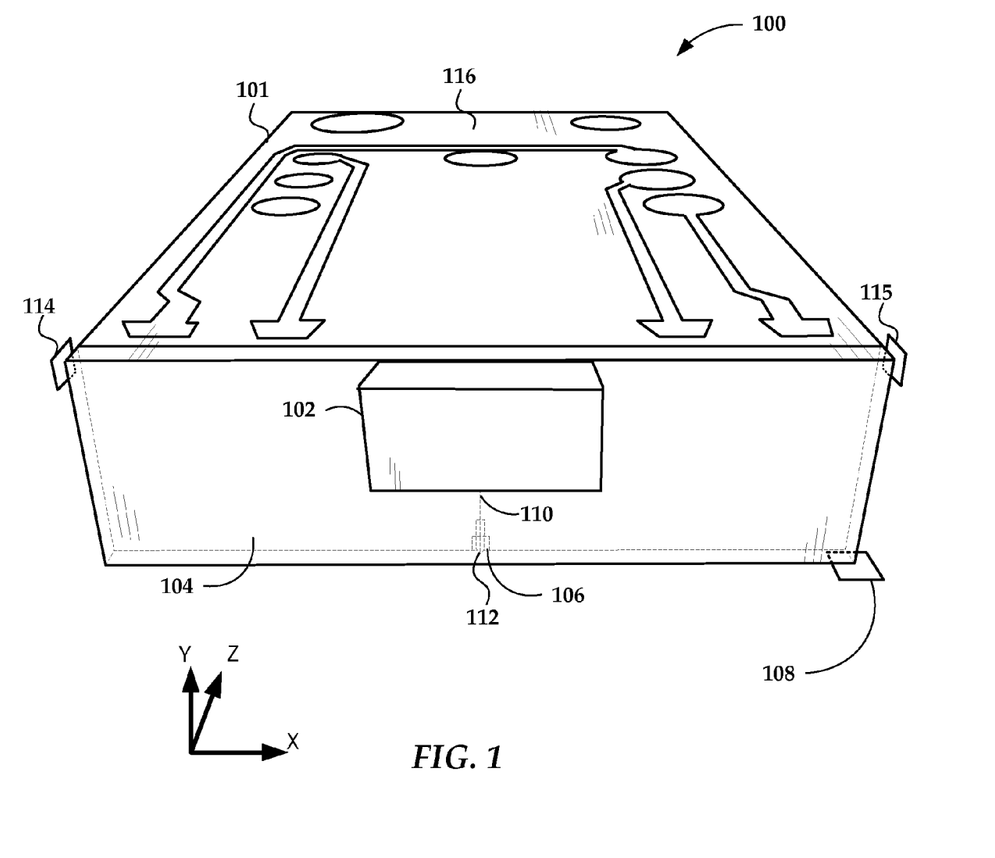
FIG. 1 is a block diagram of a slider assembly according to an example embodiment.

The laser diode 102 delivers light to a region proximate a HAMR read/write head 106, which is located near a media-facing surface 108 of the slider body 101. The media-facing surface 108 faces and is held proximate to the moving medium surface during device operation. The media-facing surface 108 may be configured as an air-bearing surface (ABS) that maintains separation from the media surface via a thin layer of air.

The laser diode 102 provides electromagnetic energy used to heat the recording medium as it passes by the read/write head 106. Optical coupling components, such as a plasmonic waveguide 110, are formed integrally within the slider device 100 and form an optical path that delivers energy from the laser diode 102 to the recording medium via a near-field transducer 112. The near-field transducer 122 is near the read/write head 106 and causes heating of the medium during recording operations.

The laser diode 102 in this example is a vertical cavity, surface-emitting laser (VCSEL). Generally, the VCSEL emits light in a direction perpendicular to a surface of the laser body. In this case, the output of the laser diode 102 is normal (or approximately so) to the input surface 104, e.g., along the z-direction. The emitted light in such a case is parallel to the media-facing surface 108. As will be described in greater detail hereinbelow, the plasmonic waveguide 110 facilitates exciting surface plasmon energy which is re-directed so that it is normal (or nearly so) to the media-facing surface 108.

While the illustrated laser diode 102 is shown on a trailing edge surface 104, any surface (such as edge surface 114 or 115) that is not parallel to the media-facing surface 108 may serve as an input surface to receive the light. Similarly, the plasmonic waveguide 110 and variations thereof described herein may be used with other types of laser diodes, such as an edge-emitting laser that emits light from an elongated channel that has an output located near a corner edge of the laser. For example, an edge-emitting laser may be mounted on the top surface 116 of the slider body 101 (e.g., in a pocket or cavity) such that the light is emitted in a direction parallel to (or at least non-perpendicular to) the media-facing surface. A surface-emitting or edge-emitting laser in any of these examples may be coupled to the slider body 101, or via a coupling component such as a submount (not shown).

While the example in FIG. 1 shows a laser diode 102 directly mounted to the slider 100, the plasmonic waveguide 110 discussed herein may be applicable to any type of light delivery configuration. For example, in a free-space light delivery configuration, a laser may be mounted externally to the slider, and coupled to the slider by way of optic fibers and/or waveguides. The slider in such an arrangement may include a coupling feature on an input surface 104, 114, 115 into which light is coupled and delivered to a plasmonic waveguide 110 which energizes the near-field transducer 112.

Figure 2:
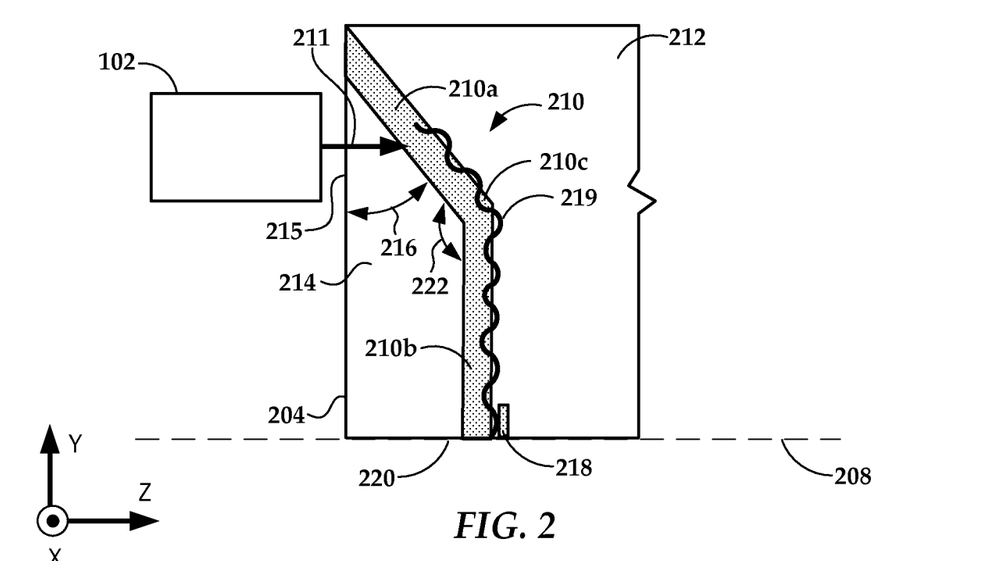
FIG. 2 is a cross sectional view illustrating a plasmonic waveguide according to an example embodiment.

In reference now to FIG. 2, a cross sectional view illustrates a plasmonic waveguide 210 according to an example embodiment (not necessarily to scale). This view is taken through the near-field transducer along a y-z-parallel plane using the coordinate system convention of FIG. 1. The views of FIGS. 3-6 also use this same convention for indicating device orientation. In FIG. 2, an input region 214 includes a high-refractive-index material and an input surface 215 configured to receive light emitted from a laser, e.g., vertical-cavity, surface-emitting laser diode 102. In this example, the input surface 215 corresponds to the trailing 204 edge of a slider assembly. While the laser 102 in this and other drawings is shown separated from the input surface 215 for purposes of drawing clarity, the laser 102 may be directly or indirectly mounted to the input surface 215.

The input region 214 includes the high-refractive-index material at least between the input surface 215 and a first portion 210a of the plasmonic waveguide 210. The high-refractive-index material may extend all the way to an output surface 220, which in this example corresponds to a media-facing surface 208 (e.g., air-bearing surface). Energy is delivered to a recording medium (not shown) through the output surface 220, e.g., via a near-field transducer 218.

The plasmonic waveguide 210 includes a first elongated portion 210a disposed at an angle 216 to the input surface 215. As described in greater detail below, this angle 216 is selected to achieve (or approach) total internal reflection of light 211 emitted from the laser 102 near the where the beam of light 211 impinges upon the first waveguide portion 210a. Assuming the light 211 is emitted perpendicularly from the laser 102 and/or input surface 215, the angle 216 is equal to an incidence angle of the light 211 onto the first portion 210a. Even if the light does not exit perpendicularly from the laser 102 and/or input surface 215, the angle 216 can be chosen to achieve the desired effect, e.g., compensate for non-perpendicular exit angles to achieve the desired incidence angle. The incidence angle is chosen to achieve total internal reflection of the light, which involves the incidence angle being larger than what is referred to in optics theory as the "critical angle."

The first elongated portion 210a receives the light 211 through the high index material of the input region 214. In response, surface plasmons 219 are excited and guided to an end 210c of the first elongated portion 210a. A second elongated portion 210b is coupled to the end 210c of the first elongated portion 210a. There is a transition angle 222 between the first and second elongated portions 210a, 210b. This transition angle 222 is greater than 90 degrees and less than 180 degrees in the example configurations.

The second elongated portion 210b is configured to guide the surface plasmons 219 to the output surface 220. The first and second portions 210a, 210b are formed of a plasmonic metal such as gold, silver, copper, aluminum, etc., and alloys thereof. The first and second portions 210a, 210b may be a film, layer, channel, etc., each having the same or different thicknesses (e.g., the z-direction dimension of portion 210b is the thickness in this example). The first and second portions 210a, 210b may also have the same or different widths, e.g., x-direction dimension in this example.

A substrate 212 is disposed on a side of the plasmonic waveguide 210 that faces away from the input region 214. This substrate 212 may include a low-refractive-index material, or may at least have a refractive index lower than the high-refractive-index material of the input region 214.

When the light 211 impinges on the interface between the input region 214 and first waveguide portion 210a, part of the light is reflected back to the high index material of the input region 214 and an evanescent wave propagates into the metal layer of the plasmonic waveguide 210. This sets up surface plasmon resonance at the interface between the plasmonic waveguide 210 and lower index material of the substrate 212. While the substrate 212 may be a bottom layer that the plasmonic waveguide 210 and other features are built upon, the waveguide structure need not limited to this arrangement. For example, the configuration may be built starting with a substrate layer at the trailing edge 204, in which case the substrate region 212 may be a deposited/filled layer of low-refractive-index material on top of the plasmonic waveguide 210.

The term "low-refractive-index material" used herein may represent a material that has a refractive index of at least 1.4 and up to 2.0, and having any value therebetween. Similarly high-refractive-index material may be in a range from 2.0 to 2.5, and having any value therebetween. The high-refractive-index material may be a dielectric material such as $TiO_2$, and the low-refractive-index material may be a dielectric material such as $Al_2O_3$. Different materials and materials outside these ranges may be also considered "high-refractive-index" so long as the material achieves total internal reflection in view of other parameters described herein. Those other parameters may include permittivity of the material used for the plasmonic waveguide 210, permittivity of material of the input portion 214, and angle 216.

Total internal reflection of the light from the laser at the input region 214 generally occurs when the incident angle of light 211 on first elongated portion 210a is greater than a critical angle $\Theta_c$ which will result in total internal reflection. In this case, the light 211 is assumed to enter surface 215 perpendicularly, so this incident angle is about the same as angle 216 of the first elongated portion 210a.

When the wave is internally reflected at interface $K_i$ (where light beam 211 intersects first portion 210a), some light will penetrate into the input region 214. The component of the wave-vector of light parallel to the interface $K_i$ can be expressed as shown below in Equation 1, where $\lambda$ is the wavelength of the laser light, n is the refractive index of the input portion material, and $\theta_i$ is the angle of incidence of the light 211 on the first elongated portion 210a.

$$K_i = (2\pi/\lambda) n \sin(\theta_i) \quad [1]$$

The wave-vector $K_p$ of the plasmon mode in the plasmonic waveguide 210 is shown below in Equation 2, where $\in_1$ is the permittivity of the metal film of the plasmonic waveguide 210 and $\in_2$ is the permittivity of the material used for the input region 214. A surface plasmon propagates along the plasmonic waveguide 210 when $K_p = K_i$.

$$K_p = (2\pi/\lambda)[(\in_1 \in_2)(\in_1 + \in_2)]^{0.5} \quad [2]$$

Figure 3:
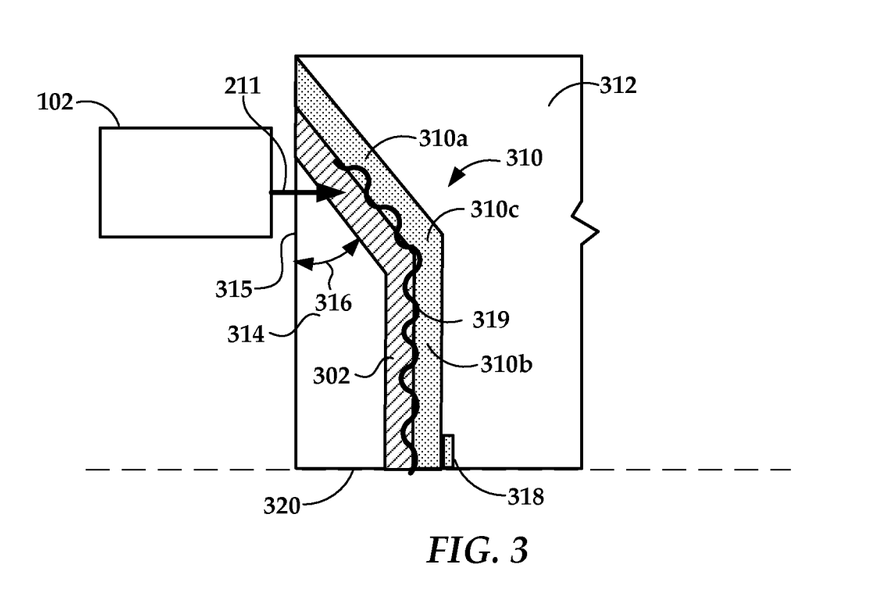
FIG. 3 is a cross sectional view illustrating a plasmonic waveguide with a low-refractive-index layer according to an example embodiment.

In reference now to FIG. 3, a cross sectional view illustrates a plasmonic waveguide 310 according to another example embodiment. An input region 314 includes a high-refractive-index material and an input surface 315 configured to receive light 211 emitted from laser 102. The input region 314 includes the high-refractive-index material at least between the input surface 315 and a layer 302 of low-refractive-index material. The layer 302 of low-refractive-index material is proximate to a first portion 310a of the plasmonic waveguide 310. The high-refractive-index material of the input region 314 and the low-refractive-index material of the layer 302 may extend all the way to an output surface 320.

Generally, the low-refractive-index layer 302 may improve robustness and reliability of the plasmonic waveguide 310. When light is incident on the interface between the high-refractive-index input region 314 and low-refractive-index layer 302, an evanescent wave propagates in a direction perpendicular to the low-refractive-index layer 302 if the thickness of the layer 302 is chosen appropriately. This may allow a thicker metal film to be used for the plasmonic waveguide 310. A thicker metal film may provide beneficial thermal properties and/or increased durability.

The output surface 320 is configured to deliver energy to a recording medium (not shown), e.g., via a near-field transducer 318. The plasmonic waveguide 310 includes a first elongated portion 310a disposed at an angle 316 to the input surface 315. This angle 316 is selected to achieve (theoretical) total internal reflection near where the light 211 intersects first elongated portion 310a of the waveguide 310. In response, surface plasmons 319 are excited and guided to an end 310c of the first elongated portion 310a.

A second elongated portion 310b is coupled to the end 310c of the first elongated portion 310a. The second elongated portion 310b is configured to guide the surface plasmons 319 to the output surface 320. A substrate 312 is disposed on a side of the plasmonic waveguide 310 that faces away from the input region 314. This substrate 312 may include a low-refractive-index material, and the index and/or material may be the same as or different from that of the layer 302. The assembly in FIG. 3 may be built on the substrate 312, or built in another order, e.g., on the input region 314.

Figure 4:
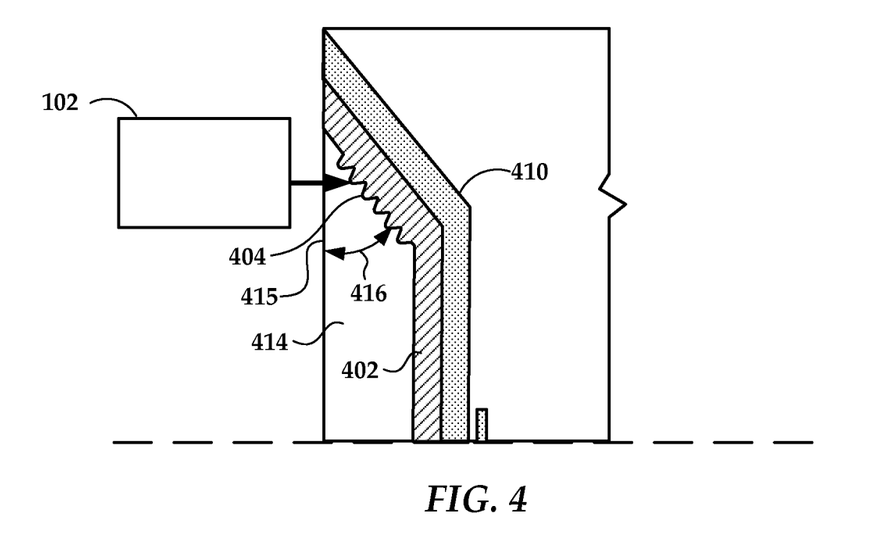
FIG. 4 is a cross sectional view illustrating a plasmonic waveguide with a low-refractive-index layer and coupling grating according to an example embodiment.

In FIG. 4, a cross sectional view illustrates a plasmonic waveguide 410 according to another example embodiment. This embodiment is similar to the embodiment shown in FIG. 3, and reference may be made to the above descriptions of FIGS. 2 and/or 3 for details of analogous features such as input surface, output surface, near field transducer, waveguide portions, substrate, etc. Generally, an input region 414 includes a high-refractive-index material that receives light emitted from laser 102. A layer 402 of low-refractive-index material is located between the input region and plasmonic waveguide 410.

A coupling grating 404 is formed at an interface between the input region 414 and low-refractive-index layer 402. The coupling grating 404 facilitates efficiently coupling light into the plasmonic waveguide 410. The coupling grating 404 is at an angle 416 to input surface 415 of the input region 414. This angle 416 is selected to maximize internal reflection of the laser light, and may be selected/determined similarly to the other embodiments described above.

Figure 5:
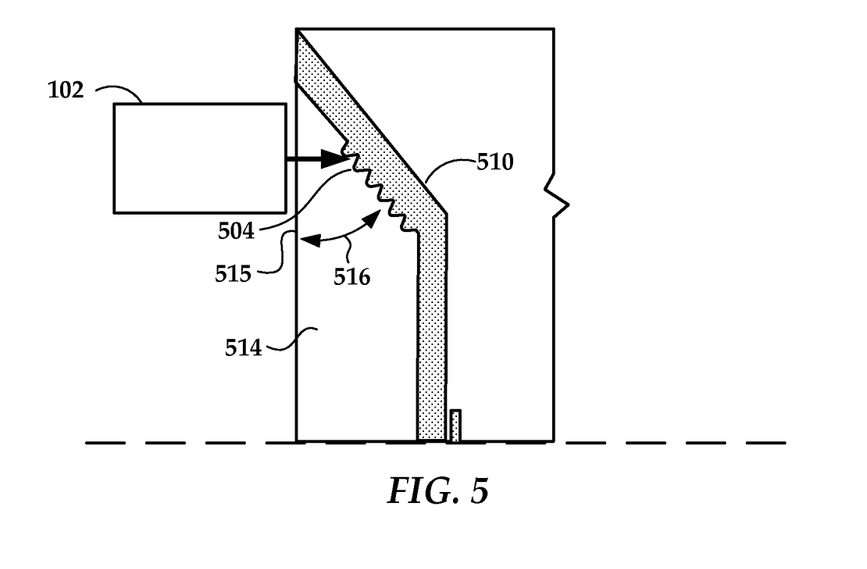
FIG. 5 is a cross sectional view illustrating a plasmonic waveguide with a coupling grating according to an example embodiment.

In FIG. 5, a cross sectional view illustrates a plasmonic waveguide 510 according to another example embodiment. This embodiment is similar in some respects to the embodiment shown in FIG. 2, and reference may be made to the above description of FIG. 2 for details of analogous features such as input surface, output surface, near field transducer, waveguide portions, substrate, etc. Generally, an input region 514 includes a high-refractive-index material that receives light emitted from laser 102. The input region 514 is located between the laser 102 and plasmonic waveguide 510.

A coupling grating 504 is formed at an interface between the input region 514 and the plasmonic waveguide 510. The coupling grating 504 facilitates efficiently coupling light into the plasmonic waveguide 510. The coupling grating 504 is at an angle 516 to input surface 515 of the input region 514. This angle 516 is selected to maximize internal reflection of the laser light, and may be selected/determined similarly to the other embodiments described above. This configuration can result in enhanced coupling via the grating 504 yet with reduced design complexity, e.g., does not include low-refractive-index layer between the input region 514 and plasmonic waveguide 510.

Figure 6:
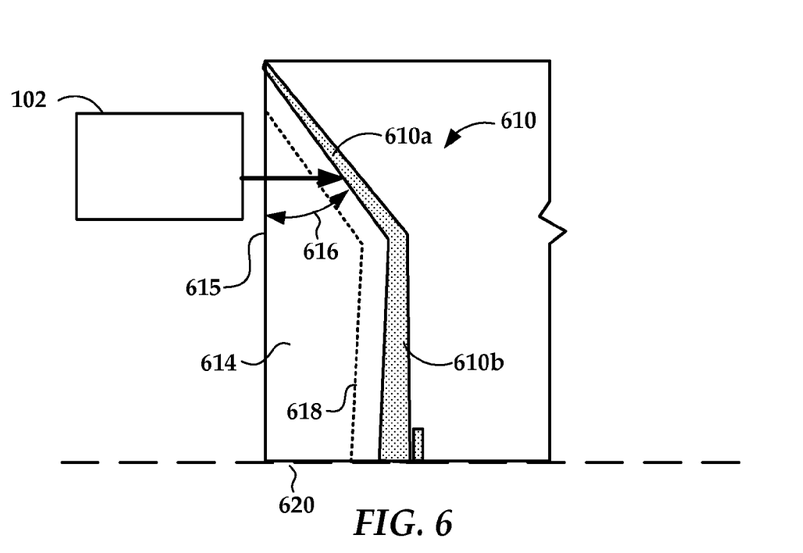
FIG. 6 is a cross sectional view illustrating a plasmonic waveguide with a varying thickness according to an example embodiment.

In FIG. 6, a cross sectional view illustrates a plasmonic waveguide 610 according to another example embodiment. This embodiment is similar in some respects to the embodiment shown in FIG. 2, and reference may be made to the description of FIG. 2 for details of analogous features such as input surface, output surface, near field transducer, waveguide portions, substrate, etc. Generally, an input region 614 includes a high-refractive-index material that receives light emitted from laser 102. The input region 614 is located between the laser 102 and plasmonic waveguide 610.

The plasmonic waveguide 610 includes a varying thickness along the propagation direction. The plasmonic waveguide 610 is narrower at a first elongated portion 610a near where the laser light impinges on the portion 610a, and increases in thickness along the direction of propagation. This tapering continues along a second elongated portion 610b of the plasmonic waveguide 610. The tapering of the waveguide portions 610a, 610b facilitates efficient coupling of the laser light into a long range propagation mode.

An increased thickness of plasmonic material as the waveguide 610 approaches the output surface 620 decreases the possibility of reflected plasmons in the waveguide 610. As the thickness of the plasmonic waveguide 610 increases, propagation of the plasmon will occur predominantly along one surface of the waveguide 610. This coincides with the original, long-range plasmon mode being converted to a more spatially-localized mode for propagation in the recording layer. It will be understood that either one or both the waveguide portions 610a, 610b can be tapered. A tapered portion waveguide portion 610a, 610b can be combined with un-tapered portion to have a constant thickness along the propagation length as shown in FIGS. 2-5.

The first elongated portion 610a is oriented at an angle 616 to that allows surface plasmons to be excited in the plasmon material of the waveguide 610. The value of the angle is selected to allow surface plasmons to be excited in the plasmonic material. This angle 616 can be chosen to maximize internal reflection as described elsewhere here. It should be noted that the angle 616 is taken from the side of the first elongated portion 610a that faces the laser 102, which is different than an angle of light intersecting the opposite side due to the taper.

The embodiment in FIG. 6 may include optional features shown elsewhere herein. For example, as indicated by dotted line 618, a layer of low-refractive-index material may be included similar to what is shown in FIG. 3. Similarly, a grate may be included at the interface between first elongated portion 610a and the input region 614, such as shown in FIG. 5. Or, if a low-refractive-index layer is included, the interface between that layer and the input region 614 may include a grate, such as shown in FIG. 4.

Figure 7:
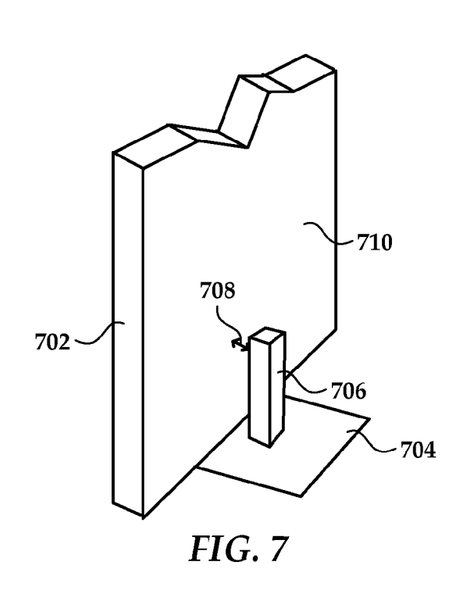
FIGS. 7 and 8 are perspective views of near-field transducing elements according to example embodiments.
Figure 8:
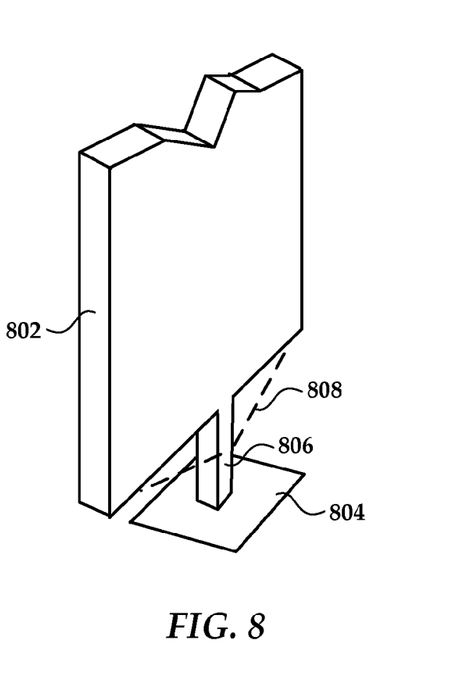

In reference now to FIGS. 7 and 8, perspective views illustrate details of features that may be used to induce spatially-localized propagation of plasmons to the media surface (not necessarily to scale). In FIG. 7, a second elongated portion 702 of a plasmonic waveguide is shown proximate a media-facing surface 704. A separate near-field transducer element 706 is positioned near the waveguide portion 702 and separated therefrom by a gap 708. The gap 708 may be filled with a dielectric material. In other embodiments, the transducer element 706 may be formed integrally with the waveguide portion 702, e.g., formed as a ridge on surface 710.

In FIG. 8, a second elongated portion 802 of a plasmonic waveguide is shown proximate a media-facing surface 804. A near-field transducer element 806 extends from an end of the waveguide portion 802. The near-field transducer element 806 may extend directly from a straight edge at end of the waveguide portion 802 as shown, or may be tapered as indicated by dashed line 808. In other embodiments, the transducer element 806 may be formed separately from the waveguide portion 802, e.g., separated from the waveguide portion 802 by a gap.

Figure 9:
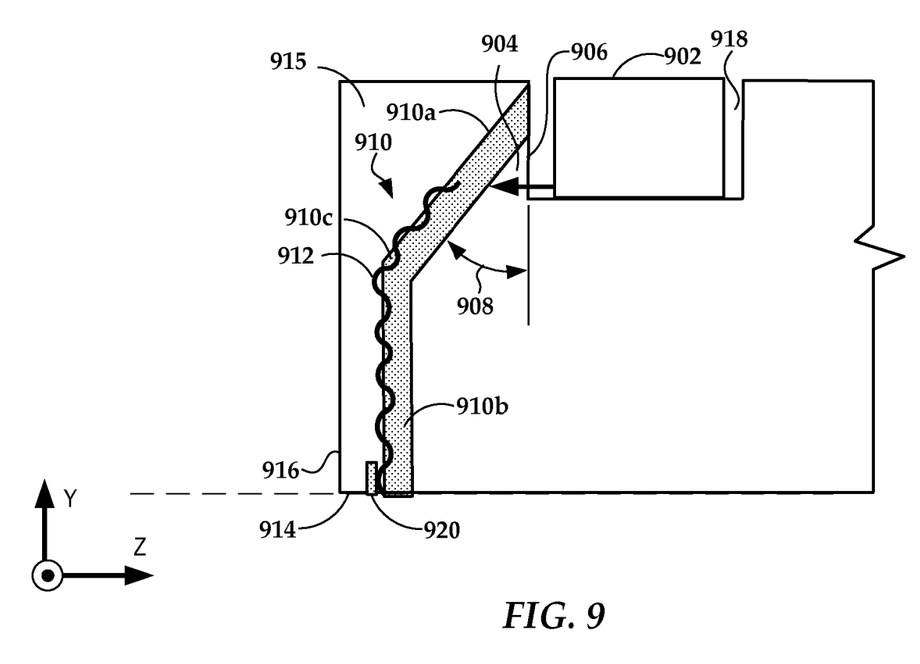
FIG. 9 is cross sectional view illustrating a plasmonic waveguide used with an edge-emitting laser according to an example embodiment.

In the previous examples, the laser diode 102 was shown as a cavity emitting laser, e.g., VCSEL. However the plasmonic waveguide need not be limited for use with cavity emitting lasers. In FIG. 9, a cross sectional view illustrates a plasmonic waveguide 910 used with an edge-emitting laser 902 according to an example embodiment (not necessarily to scale). Generally, an input region 904 includes a high-refractive-index material that receives light emitted from laser 902. The input region 904 is located between the laser 902 and a plasmonic waveguide 910. An input surface 906 configured to receive light emitted from the laser 902. A substrate 915 (or fill region) is proximate a side of the waveguide 910 that faces away from the input region 904. This substrate 915 (or fill region) may include a low-refractive-index material.

The waveguide 910 includes a first elongated portion 910a at an angle 908 to the input surface 906. The first elongated portion 910a is configured to receive the light through high-refractive-index material of the input region 904. In response, surface plasmons 912 are excited and guided to an end 910c of the first elongated portion. A second elongated portion 910b of the plasmonic waveguide 910 is coupled to the end 910c of the first elongated portion 910a and configured to guide the surface plasmons to an output surface 914, e.g., media-facing surface. A near-field transducer 920 may be included near the output surface 914.

In this example, the input surface 906 is parallel to but separate from a trailing edge surface 916. This is facilitated by mounting the laser 902 in a pocket/depression 918 at the top of the slider body. For purposes of drawing clarity, the laser 902 is shown separated from the mounting surface 906, but may in practice be directly or indirectly mounted to the input surface 906. In other embodiments, the waveguide 910 and surrounding features (e.g., input region 904, near-field transducer 920) may be included as a part attached to the slider body that protrudes above the top surface of the slider body, thereby facilitating optical coupling with an output of the laser 902. This embodiment may optionally include any combination of additional layers of low-refractive-index material proximate the waveguide 910 as shown in FIGS. 3 and 4, gratings on the waveguide 910 or low-index layers as shown in FIGS. 4 and 5, and tapers as shown in FIG. 6.

It will be understood that the example embodiments many include variations from what is shown in FIGS. 2-9. For example, in any of these embodiments, the first and second elongated portions may have different average thicknesses, and one or both of the portions may have a tapered thickness. The plasmonic waveguides may include additional plasmonic portions, e.g., additional portions located between the first and second elongated portions. These additional portions may be curved, straight and oriented with an intermediate angle between the first and second portions, etc. The plasmonic waveguide embodiments in FIGS. 2-9 may be used with edge-emitting or cavity emitting lasers, and may also be utilized with externally mounted lasers or energy sources that are coupled by way of fibers, waveguides, etc.

Figure 10:
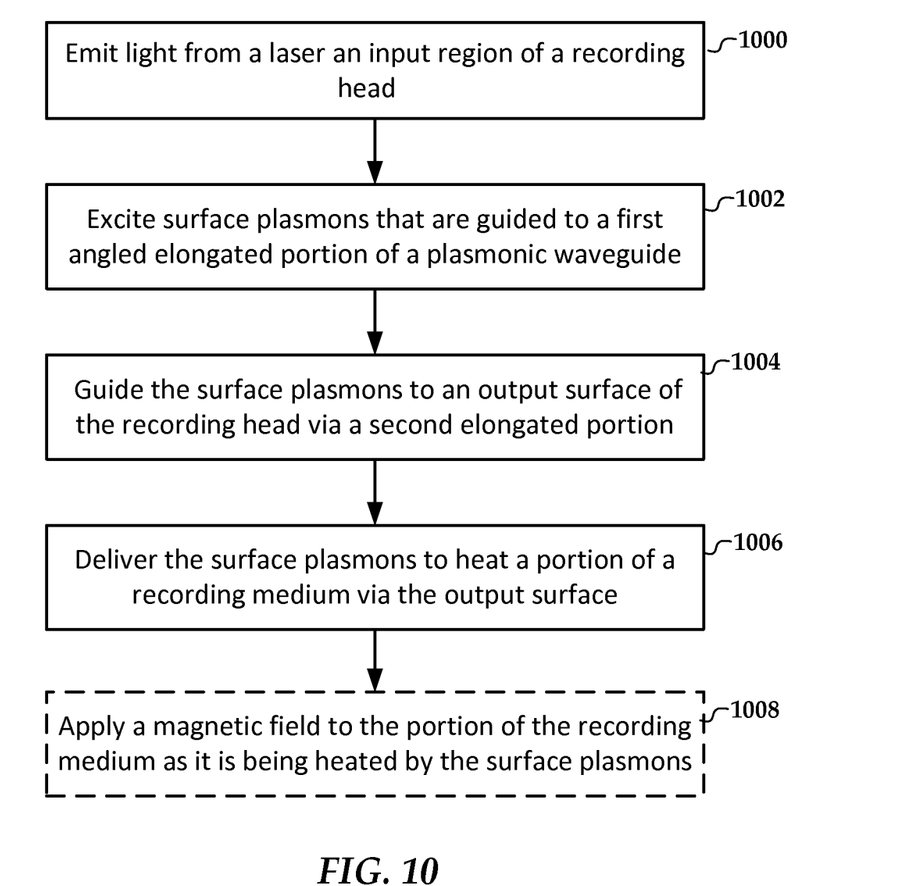
FIG. 10 is a flowchart illustrating a method according to an example embodiment.

In reference now to FIG. 10, a flowchart illustrates a method according to an example embodiment. The method involves emitting 1000 light from a laser to an input surface of an input region of a recording head. The input region includes a high-refractive-index material, and the light may be (although is not required to be) emitted normal to the input surface. In response to emitting 1000 the light, surface plasmons are excited 1002 and guided to an end of a first elongated portion of a plasmonic waveguide. The first elongated portion is disposed at an angle to the input surface. The angle of the first elongated portion may be selected so that total internal reflection of the light is achieved (or so that the amount of internal reflection is maximized) proximate the first elongated portion.

The method further involves guiding 1004 the surface plasmons to an output surface of the recording head via a second elongated portion of the plasmonic waveguide. The second elongated portion is coupled to (and at an angle to) the end of the first elongated portion. The first and second elongated portions may include a gold film, layer, or channel. The surface plasmons are delivered 1006 to heat a portion of a recording medium via the output surface. Optionally, a magnetic field may be applied 1008 to the portion of the recording medium as it is being heated by the surface plasmons. In this way, the magnetic field records data to the recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising: an input region comprising a high-refractive-index material and an input surface configured to receive light emitted from a laser; an output surface configured to deliver energy to a recording medium; and a plasmonic waveguide comprising: a first elongated portion at a non-zero angle of less than 90 degrees to the input surface and configured to receive the light through the input region and, in response thereto, excite surface plasmons that are guided to an end of the first elongated portion; and a second elongated portion coupled to the end of the first elongated portion at a non-zero transition angle to the first elongated portion, the second elongated portion configured to guide the surface plasmons to the output surface.

2. The apparatus of claim 1, wherein the angle of the first elongated portion is selected so that total internal reflection of the light is achieved proximate the first elongated portion.

3. The apparatus of claim 1, wherein the input surface is perpendicular to the output surface.

4. The apparatus of claim 3, wherein the light is emitted from the laser perpendicular to the input surface.

5. The apparatus of claim 1, wherein the first elongated portion and the second elongated portion comprise a gold film, layer, or channel.

6. The apparatus of claim 1, wherein the laser comprises a vertical-cavity, surface-emitting laser.

7. The apparatus of claim 1, further comprising a grating at an interface of the high-refractive-index material with the first elongated portion of the plasmonic waveguide.

8. The apparatus of claim 1, further comprising a layer of low-refractive-index material between the high-refractive-index material and the plasmonic waveguide.

9. The apparatus of claim 8, further comprising a grating at an interface between the first elongated portion of the plasmonic waveguide.

10. The apparatus of claim 1, further comprising a substrate of low-refractive-index material on a side of the plasmonic waveguide facing away from the input region.

11. The apparatus of claim 1, further comprising a plasmonic near-field transducer proximate the output surface and coupled to the second elongated portion so that the surface plasmons are tunneled to the recording medium.

12. The apparatus of claim 1, wherein the recording medium comprises a magnetic recording medium.

13. The apparatus of claim 1, wherein the output surface comprises an air-bearing surface.

14. The apparatus of claim 1, wherein at least one of the first elongated portion and the second elongated portion comprise a gradually increasing thickness along a propagation direction from the input surface to the output surface.

15. A method comprising: emitting light from a laser to an input surface of an input region of a recording head, the input region comprising a high-refractive-index material; in response to emitting the light, exciting surface plasmons at a first elongated portion of a plasmonic waveguide, the first elongated portion being disposed at a non-zero angle of less than 90 degrees to the input surface; guiding the surface plasmons to an output surface of the recording head via a second elongated portion of the plasmonic waveguide that is coupled to the end of the first elongated portion at a non-zero transition angle to the first elongated portion; and delivering the surface plasmons to heat a portion of a recording medium via the output surface.

16. The method of claim 15, further comprising applying a magnetic field to the portion of the recording medium as it is being heated by the surface plasmons, the magnetic field recording data to the recording medium.

17. The method of claim 15, wherein the angle of the first elongated portion is selected so that total internal reflection of the light is achieved proximate the first elongated portion.

18. The method of claim 15, wherein the first elongated portion and the second elongated portion comprise a gold film, layer, or channel.

19. An apparatus comprising:
an input surface configured to receive light emitted from a laser;
an output surface configured to deliver energy to a recording medium; and
a metallic, plasmonic waveguide comprising:
a first elongated portion at an angle to the input surface and configured to receive the light through a high-refractive-index material and, in response thereto, excite surface plasmons that are guided to an end of the first elongated portion; and
a second elongated portion coupled to the end of the first elongated portion at a transition angle to the first elongated portion, the second elongated portion configured to guide the surface plasmons to the output surface, at least one of the first and second elongated portions having a gradually increasing thickness along a propagation direction from the input surface to the output surface.

20. The apparatus of claim 19, wherein the angle of the first elongated portion is selected so that total internal reflection of the light is achieved proximate the first elongated portion.

* * * * *